United States Patent [19]
Yanagi et al.

[11] Patent Number: 5,357,300
[45] Date of Patent: Oct. 18, 1994

[54] LENS HOLDING DEVICE CAPABLE OF ADJUSTING LENS POSITION

[75] Inventors: Toshio Yanagi, Machida; Kiyoaki Hazama; Masayoshi Era, both of Hachioji, all of Japan

[73] Assignee: Konica Corporation, Tokyo, Japan

[21] Appl. No.: 920,663

[22] Filed: Jul. 28, 1992

[30] Foreign Application Priority Data

Aug. 19, 1991 [JP] Japan ................ 3-065310[U]

[51] Int. Cl.⁵ .................................. G03B 1/18
[52] U.S. Cl. .................. 354/195.1; 354/286; 354/288; 359/822
[58] Field of Search ............. 354/195.1, 286, 288; 359/822

[56] References Cited

U.S. PATENT DOCUMENTS 3,220,308 11/1965 Lareau ............... 354/195.1
4,690,505 9/1987 Iizuka et al. ........... 359/822
4,733,945 3/1988 Bacich ................ 354/286

FOREIGN PATENT DOCUMENTS 63-153235 7/1988 Japan.

*Primary Examiner*—Monroe H. Hayes
*Attorney, Agent, or Firm*—Finnegan, Henderson, Farabow, Garrett & Dunner

[57] ABSTRACT

In a lens holding device, a plurality of protrusions of equal height are provided oppositely at the front and rear of the periphery of a plastic photographic lens. The plurality of protrusions are substantially equidistant. Three sets of stairs, each having a plurality of steps with a predetermined difference in height between adjacent steps, are provided at positions corresponding to the protrusions in a lens receiving member and a lens pressing member, between which the lens is sandwiched. The position of the lens can be adjusted from a most advanced position to a most retreated position along the optical axis by selecting a preferred step of each of the stairs.

19 Claims, 3 Drawing Sheets

LENS HOLDING DEVICE CAPABLE OF ADJUSTING LENS POSITION

BACKGROUND OF THE INVENTION

The present invention relates to a holding device for a lens such as a photographing lens for use in a relatively low cost camera or a single lens for a recording apparatus.

Since a high performance plastic lens can now be manufactured, a lens made of a resin composed of transparent acrylic material, that is, a plastic lens, is used for a photographing lens of a relatively low cost camera, a condenser lens of a laser recording apparatus, or the like.

The plastic lens is manufactured, as widely known, by means of injection molding of resin, for which metallic molds are used. In this case, generally a plurality of metallic molds are prepared for mass production, and a plurality of cavities are made in one metallic mold when the size of plastic lens is small, and thereby it is inevitable that some dispersion is produced, for example, in a focal length depending on the difference between metallic molds or cavities used in manufacturing different lots.

Therefore, when the lens is mounted, an adjusting operation of the lens position is required, and a method by which the number of thin spacers sandwiched between mounting surfaces is increased or decreased, or a method by which the lens position is adjusted finely in the optical axis direction by rotating the lens which is contacted with an inclined surface with pressure through an elastic member, is conducted conventionally.

However, additional members such as the spacer or the elastic member are necessary for the above-mentioned methods, and further the operation which adjusts them is troublesome and inefficient, and therefore these become factors which increase the cost. Further, when lens holding is conducted by contacting the lens with the inclined surface, the adjusting operation must be conducted while confirming the focal position by means of a magnifier or the like.

SUMMARY OF THE INVENTION

The object of the present invention is to provide a lens holding device in which additional members are not necessary at all, and further the lens position can be adjusted by means of an extremely simple operation.

The present invention is composed of a lens holding device which is characterized in that: protruded portions of the lens having respectively equal height are provided opposingly at front and rear positions, in a plurality of substantially equidistant positions around the peripheral portion of the lens; a plurality of stairs portions having steps are provided in a lens receiving member and a lens pressing member, by which the lens is sandwiched from both sides, which correspond to the protruded portions; and the lens position can be adjusted when the steps with which the lens protruded portion comes into contact is selected.

DETAILED DESCRIPTION OF THE PREFERRED EMBODIMENT

Figure 1:
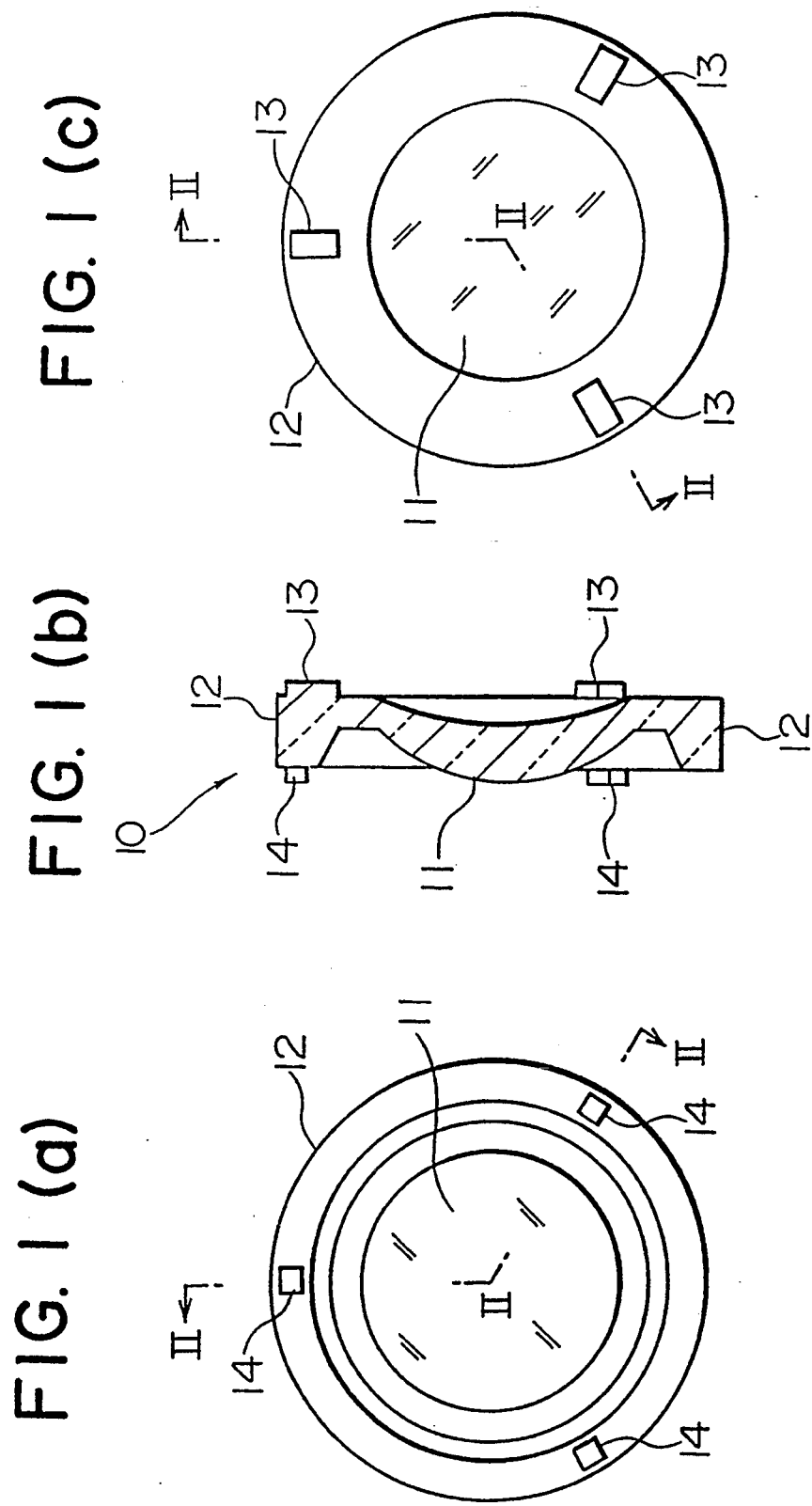
FIG. 1(a) to FIG. 1(c) are drawings showing an outer shape of a lens which is mounted to a lens holding device according to the present invention.

FIG. 1(a) to FIG. 1(c) show a shape of a lens 10 which is mounted on a lens holding device of the present invention, and FIG. 1(a) shows a front view of the lens 10, FIG. 1(b) shows a sectional view of the lens 10, and FIG. 1(c) shows a rear view of the lens 10.

The lens 10 is a plastic lens made by resin molding, and composed of a central lens portion 11, in which the curved surface of the lens is formed, and a flange-shaped lens peripheral portion 12 by which the outer circumference of the lens portion 11 is connected.

The lens protruded portions 14 and 13 are provided at a plurality of substantially equidistant positions around the circumference of the lens, and in this embodiment the number of the protruded portions is made three for example; they are provided to the front and rear of the lens; and the front and rear protruded portions 13 and 14 are opposed.

The lens protruded portions 13 and 14 are formed at the height which exceeds slightly an amount of position adjustment required for the lens 10, wherein the height of the protruded portions 13 and 14 may be equal or different according to circumstances.

Figure 2:
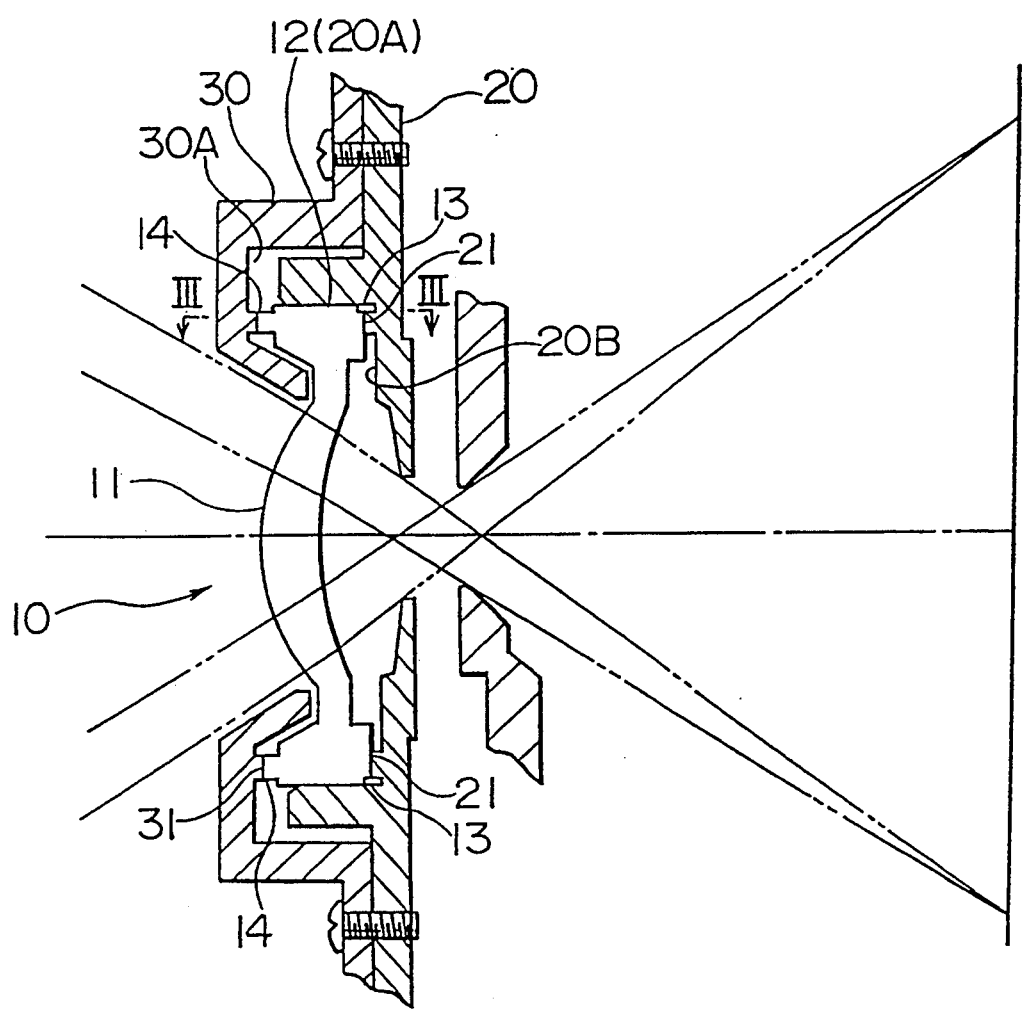
FIG. 2 is a sectional view showing the lens holding device.

FIG. 2 is a sectional view showing the holding device of the lens 10, taken along an arrowed line II—II in FIG. 1(a) and FIG. 1(c).

Numeral 20 is a lens receiving member, and numeral 30 is a lens pressing member, wherein the lens 10 is sandwiched between the lens receiving member 20 and the lens pressing member 30 and fixed therebetween.

In the lens receiving member, an inner circumferential portion 20A into which the lens peripheral portion 12 of the lens 10 is engaged, is provided, and stairs 21, with which the lens protruded portion 13 is contacted, is provided at the position corresponding to the protruded portions, on a lens mount surface 20B which receives the lens 10 indirectly.

Stairs 31, with which the lens protruded portion 14 is contacted, and which is opposed to each of stairs 21 of the lens receiving member 20, is provided on a lens holding surface 30A of the lens pressing member 30.

As shown in the drawing, the lens pressing member 30 is fixed on the lens receiving member 20 by means of screws. At this time, the lens 10 is fixed with a proper pressing strength by the elastic action of the lens pressing member 30. It is a matter of course that the lens 10 may be fixed, without depending on the elasticity of the lens pressing member 30, in the following manner: the lens 10 is pressed under the condition that the lens pressing member 30 is slightly raised; and the screwed portion of the lens pressing member 30 is fixed by means of an adhesive agent.

Another method in which a hook portion of one member is engaged with an engagement portion of the other member may be applied to the connection method of the lens pressing member 30 with the lens receiving member 20, wherein the connection method is the same as that of a front cover with a main body which is disclosed in Japanese Utility Model Open to Public Inspection No. 153235/1988 proposed by the inventors. Further, the lens 10 may be fixed to the lens receiving member 20 by the following methods: the pressing member 30 is integrally provided to the front cover, which is not shown in the drawing; and the front cover is engaged with the camera main body on which the lens receiving member is integrally provided.

Figure 3A:
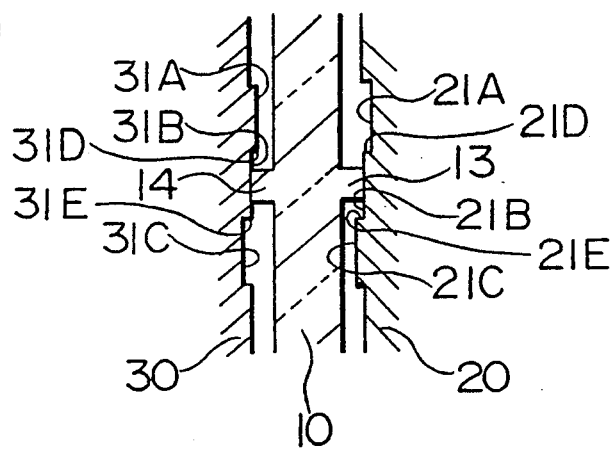
FIG. 3(a) to FIG. 3(c) are illustrations showing a lens position adjusting method.
Figure 3B:
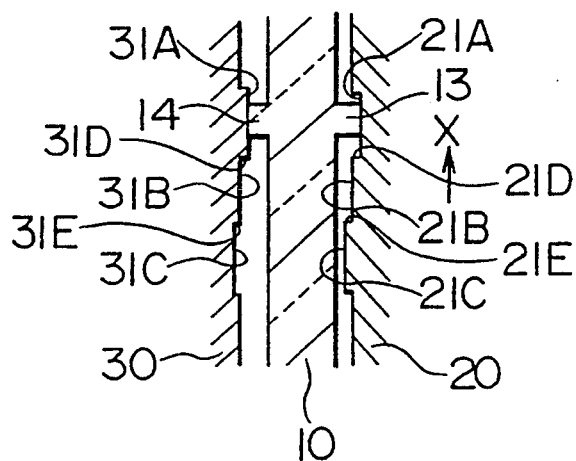
Figure 3C:
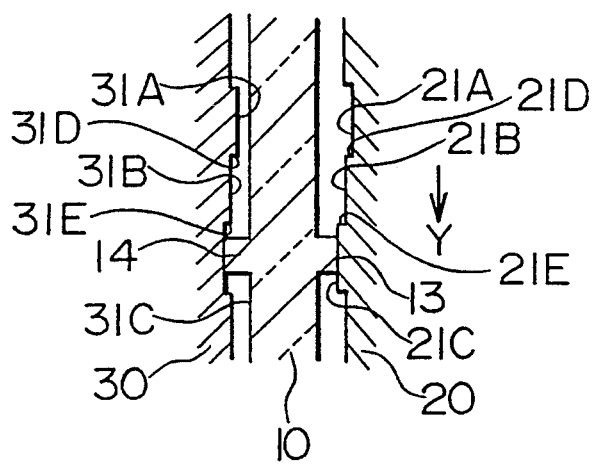

FIG. 3(a) to FIG. 3(c) are drawings showing a cross section taken along an arrowed line III—III and viewed from the arrowed direction in FIG. 2. Each of stairs 21 of the lens receiving member 20 is composed of three steps 21A, 21B, 21C disposed successively in the circumferential direction and risers 21D and 21E which are connected with adjacent steps, as shown in FIG. 3(a), wherein the steps have, for example, the difference of height of 0.2 mm respectively in the direction of the optical axis.

Each of stairs 31 of the lens pressing member 30 is also composed of three steps 31A, 31B, 31C and risers 31D and 31E which are connected with adjacent steps, wherein the steps have respectively the difference of height of 0.2 mm, corresponding to the stairs 21.

The distance between opposing steps is kept always in a constant value in which the lens 10 can be pressed and fixed. The number of steps with which stairs 21 and 31 are provided respectively, is not limited to three, but may be not less than two with respect to both the lens receiving member 20 and lens pressing member 30. Further, the shape of each of stairs is not limited to a stairs-form in one direction when the distance between opposing steps is kept constant.

Since the lens protruded portions 13 and 14 have equal height not less than 0.6 mm, an adjustment of the position of the lens 10 is conducted by selecting proper combination of steps of stairs 21 and 31 with which the lens protruded portions 13 and 14 are contacted.

That is, when the lens protruded portions 13 and 14 are sandwiched between steps 21A and 31A, as shown in FIG. 3(b), the lens 10 is retreated by an equivalent value to 0.2 mm in the direction of the optical axis from the position as shown in FIG. 3(a).

Further, when the lens protrusions 13 and 14 are sandwiched between steps 21C and 31C, as shown in FIG. 3(c), the lens 10 is advanced by an equivalent value to 0.2 mm in the direction of the optical axis from the position as shown in FIG. 3(a).

As described above, since the lens position can be adjusted when any of steps of the stairs having the difference of height therebetween, is selected, and the lens is held by the selected steps, the lens position corresponding to the required accuracy and required adjustment range can be obtained when the difference of height between steps and the number of steps are properly selected. In the present embodiment, the protruded portions 13 and 14 are provided on the lens peripheral portions 12, the lens mount surface 20B having stairs is provided on the lens receiving member 20, and the lens holding surface 30A having stairs is provided on the lens pressing member 30. However, the present invention is not limited by the aforementioned, but it may be structured in the following manner: the protruded portion is provided on the outer circumferential portion of the lens peripheral portion; and the protruded portion is sandwiched between the lens receiving member 20 and the lens pressing member 30 so that the lens 10 can be held. On the contrary, the present invention is not limited to the foregoing, but it may be structured in the following manner: stairs having steps are provided on both surfaces of the lens peripheral portion 12; protruded portions are provided on the lens receiving member 20, and protruded portions of the lens pressing member 30 are provided corresponding to the aforementioned protruded portions. Further, the lens holding device according to the present invention is not limited to the foregoings, but it may be structured in the following manner: said stairs are provided on one surface of the lens peripheral portion 12, and protruded portions are provided on another surface of the lens peripheral portion; stairs are provided on either lens receiving member 20 or lens pressing member 30 at the position corresponding to the aforementioned protruded portions; and protruded portions are provided on another member which is not provided with the stairs.

Distance between steps is desirably determined by considering not only the dispersion of lens forming, but also the accuracy of the focal distance required for the apparatus. Further, when the lens is mounted on the lens holding device, an index may be provided on each contacting surface or in the vicinity thereof in order to easily decide by which contacting surfaces the protruded portion of the lens should be sandwiched.

According to the present invention, the lens holding device in which no focus slippage can be generated, and which is structured in the following manner can be provided, in which: excess members such as a spacer or elastic members are not necessary; the lens position can be finely and precisely adjusted and set by a simple structure and an easy operation, according to measurement data confirmed previously using a sample, or simple evaluation of image formation; and even when the lens is moved in the direction of its circumference, due to mechanical shock or vibration, the movement of the lens is limited by risers of stairs of the lens receiving member and/or the lens pressing member.

What is claimed is:
1. A lens holding device comprising:
(a) a lens including a peripheral portion around which a plurality of protruded portions are provided substantially equidistant to each other;
(b) a lens receiving member in which a plurality of stairs are provided at positions corresponding to said protruded portions, each of said stairs having a plurality of steps and risers; and
(c) a lens pressing member in which a plurality of stairs are provided at positions to face said stairs of said lens receiving member, each of said stairs having a plurality of steps and risers, said stairs determining the position of said lens on the optical axis thereof in association with said stairs of said lens receiving member utilizing a predetermined difference in height between adjacent steps, wherein said lens is sandwiched between said lens receiving member and said lens pressing member so that said lens position is fixed on said optical axis, and said lens position is adjusted from a most advanced position to a most retreated position along said optical axis by selecting a preferred step height in each of said stairs, further wherein rotation of said lens around said optical axis is restrained with said risers adjacent to said selected steps of said stairs.

2. The device of claim 1 wherein said protruded portions protrudes forward and rearward along the optical axis of said lens, and each protruded height in same direction is equal.

3. The device of claim 1 wherein said lens is a molded resin lens.

4. The device of claim 1 wherein said protruded portions of said lens are provided at three points.

5. The device of claim 1 wherein each of said stairs comprises three steps.

6. The device of claim 1 wherein said predetermined difference in height between adjacent steps is about 0.2 min.

7. The lens holding device of claim 1, wherein the steps of the lens receiving member and the steps of the lens pressing member are substantially perpendicular to the optical axis of the lens.

8. A lens holding device comprising:
(a) a lens including a peripheral portion around which a plurality of stairs are provided substantially equidistant to each other on front and rear surfaces of said peripheral portion, each of stairs having a plurality of steps and risers for determining the position of said lens on the optical axis thereof with a predetermined difference in height between adjacent steps;
(b) a lens receiving member in which a plurality of protruded portions having respectively equal height are provided at positions to face said stairs; and
(c) a lens pressing member in which a plurality of protruded portions having respectively equal height are provided at positions to face said stairs, wherein said lens is sandwiched between said lens receiving member and said lens pressing member so that said lens is fixed on said optical axis, and said lens position is adjusted from a most advanced position to a most retreated position along said optical axis by selecting a preferred step height in each of said stairs, further wherein rotation of said lens around said optical axis is restrained with said risers adjacent to said selected steps of said stairs.

9. The device of claim 8 wherein said lens is a molded resin lens.

10. The device of claim 8 wherein said protruded portions of said lens receiving member and said pressing member are provided at three points respectively.

11. The device of claim 8 wherein each of said stairs comprises three steps.

12. The device of claim 8 wherein said predetermined difference in height between adjacent steps is about 0.2 mm.

13. The lens holding device of claim 8, wherein the steps on the peripheral portion of the lens are substantially perpendicular to the optical axis of the lens.

14. A lens holding device comprising:
(a) a lens including a peripheral portion having a first surface and a second surface on rear and front sides respectively;
(b) a lens receiving member facing said first surface of said lens, wherein a plurality of first stairs are provided at said first surface of said lens or said lens receiving member, and a plurality of first protruded portions are provided at the other, and said first protruded portions having equal height are provided substantially equidistant to each other, and said first stairs are provided at positions corresponding to said first protruded portions, each of said first stairs having a plurality of steps and risers; and
(c) a lens pressing member facing said second surface of said lens, wherein a plurality of second stairs are provided at said second surface of said lens or said lens pressing member, and a plurality of second protruded portions are provided at the other, and said second protruded portions having equal height are provided substantially equidistant to each other, and said second stairs are provided at positions corresponding to said second protruded portions, each of said second stairs having a plurality of steps and risers, said second stairs determining the positions of said lens on the optical axis thereof in association with said first stairs utilizing a predetermined difference in height between adjacent steps, and wherein said lens is sandwiched between said lens receiving member and said lens pressing member so that said lens is fixed on said optical axis, and said lens position is adjusted from a most advanced position to a most retreated position along said optical axis by selecting a preferred step height in each of said stairs, further wherein rotation of said lens around said optical axis is restrained with said risers adjacent to said selected steps of said stairs.

15. The device of claim 14 wherein said first and second protruded portions are provided at three points.

16. The device of claim 14 wherein each of said first and second stairs comprises three steps.

17. The device of claim 14 wherein said lens is a molded resin lens.

18. The device of claim 14 wherein the predetermined difference in height between adjacent steps is about 0.2 mm.

19. The lens holding device of claim 14, wherein the steps of the first stairs and the steps of the second stairs are substantially perpendicular to the optical axis of the lens.

* * * * *

UNITED STATES PATENT AND TRADEMARK OFFICE
CERTIFICATE OF CORRECTION

PATENT NO. : 5,357,300
DATED : October 18, 1994
INVENTOR(S) : Toshio YANAGI et al.

It is certified that error appears in the above-indentified patent and that said Letters Patent is hereby corrected as shown below:

Claim 2, column 4, line 62 change "protrudes" to --protrude--.

Signed and Sealed this

Sixth Day of June, 1995

Attest:

Attesting Officer

BRUCE LEHMAN

Commissioner of Patents and Trademarks